United States Patent
Rybak et al.

(10) Patent No.: US 7,117,756 B2
(45) Date of Patent: Oct. 10, 2006

(54) LOAD DETECTING VEHICLE SEAT ASSEMBLY

(75) Inventors: Stephen R Rybak, Lake Orion, MI (US); David P Pawlitz, Clinton Township, MI (US); Paul Glinka, Waterford, MI (US); Michael P Modreski, Wixom, MI (US)

(73) Assignee: Lear Corporation, Southfield, MI (US)

( * ) Notice: Subject to any disclaimer, the term of this patent is extended or adjusted under 35 U.S.C. 154(b) by 30 days.

(21) Appl. No.: 10/904,161

(22) Filed: Oct. 27, 2004

(65) Prior Publication Data

US 2006/0086182 A1    Apr. 27, 2006

(51) Int. Cl.
*G01L 1/22* (2006.01)

(52) U.S. Cl. ................................. 73/862.474

(58) Field of Classification Search ........... 73/862.474, 73/862.621, 862.391, 120
See application file for complete search history.

(56) References Cited

U.S. PATENT DOCUMENTS

| | | | |
|---|---|---|---|
| 6,231,076 B1 | 5/2001 | Blakesley et al. | |
| 6,242,701 B1 | 6/2001 | Breed et al. | |
| 6,431,013 B1 | 8/2002 | Nonnenmacher et al. | |
| 6,467,361 B1 | 10/2002 | Rainey et al. | |
| 6,520,023 B1 * | 2/2003 | Kimura | 73/795 |
| 6,684,718 B1 * | 2/2004 | Muraishi | 73/862.474 |
| 6,748,814 B1 * | 6/2004 | Ishida et al. | 73/862.391 |
| 2001/0011481 A1 | 8/2001 | Nonenmacher et al. | |
| 2001/0037903 A1 | 11/2001 | Breed et al. | |
| 2001/0037904 A1 | 11/2001 | Breed et al. | |
| 2002/0062699 A1 * | 5/2002 | Kimura | 73/795 |
| 2002/0134167 A1 | 9/2002 | Rainey et al. | |
| 2003/0066363 A1 * | 4/2003 | Sakamoto et al. | 73/862.474 |
| 2003/0067196 A1 * | 4/2003 | Sakamoto et al. | 297/217.1 |
| 2003/0084731 A1 * | 5/2003 | Muraishi | 73/849 |
| 2003/0106723 A1 * | 6/2003 | Thakur et al. | 177/144 |
| 2003/0131671 A1 * | 7/2003 | Ishida et al. | 73/862.621 |
| 2004/0035224 A1 * | 2/2004 | Kajiyama et al. | 73/862.474 |
| 2004/0045759 A1 * | 3/2004 | Kiribayashi | 180/271 |
| 2004/0124018 A1 * | 7/2004 | Yanagi | 177/144 |

* cited by examiner

*Primary Examiner*—Edward Lefkowitz
*Assistant Examiner*—Andre Allen
(74) *Attorney, Agent, or Firm*—Bir Law, PLC; David S. Bir

(57) ABSTRACT

A load detecting vehicle seat assembly includes a discrete strain gage mounting plate having a specified flatness to produce desired strain gage performance. The strain gage mounting plate is disposed between a strain gage and a vehicle seat component, such as a cushion frame, so that vehicle seat loading is transferred to the strain gage through the mounting plate. The strain gage may be mounted with a central portion secured to a lower vehicle seat component and outward portions secured to an upper vehicle seat component such that only the outward portions of the strain gage contact the strain gage mounting plate, which has a controlled flatness tolerance to produce desired strain gage performance.

15 Claims, 2 Drawing Sheets

LOAD DETECTING VEHICLE SEAT ASSEMBLY

BACKGROUND OF THE INVENTION

1. Field of the Invention

The present invention relates to load detecting vehicle seat assemblies.

2. Background Art

A number of vehicle manufacturers have implemented vehicle seat load sensing systems, particularly for use in determining whether and/or how forcefully to deploy one or more airbags in an accident. One strategy for detecting the weight or load placed on a vehicle seat is to use one or more strain gages associated with a particular seat or position on the seat. The strain gage or gages may be positioned so that a load (such as created by an occupant) on the vehicle seat deflects an associated surface of the strain gage with the deflection or strain used to generate a corresponding signal indicative of the load. For repeatable measurements with a desired accuracy, strain gages may require a specific flatness tolerance for the mounting surface of the seat component. Due to the size and/or complexity of the components that may have surfaces suitable for mounting the strain gage, such as the cushion frame, seat adjuster, and/or seat riser, for example, manufacturing such components with the desired flatness tolerance for accurate load indication of the strain gage(s) is difficult and may result in increased cost and/or unusable (scrap) components.

SUMMARY OF THE INVENTION

The present invention includes a load detecting vehicle seat assembly having a discrete strain gage mounting plate with a specified flatness to produce desired strain gage performance. The strain gage mounting plate is disposed between a strain gage and a vehicle seat component, such as a cushion frame, so that vehicle seat loading is transferred to the strain gage through the mounting plate.

Embodiments of the invention include a vehicle seat assembly having a strain gage with a central portion secured to a lower vehicle seat component and outward portions secured to an upper vehicle seat component, with the outward portions contacting a strain gage mounting plate having a specified flatness, such that the outer portions flex in response to vehicle seat loading. In one embodiment, the lower vehicle seat component is a seat adjuster and the upper vehicle seat component is the cushion frame so that the strain gage is located between the seat adjuster and the cushion frame. Strain gage assemblies having a mounting plate with a specified flatness may be provided for each location that the seat is secured to the lower component, such as the adjuster, riser, or floor of the vehicle.

The present invention provides a number of advantages. For example, the present invention provides a load sensing vehicle seat assembly that satisfies strain gage mounting requirements using a mounting plate disposed between the strain gage and vehicle seating component. Use of a smaller component to satisfy the strain gage flatness mounting requirement may result in significant cost savings relative to manufacturing larger and/or more complex components with the desired flatness, such as the cushion frame or seat adjuster for example. Positioning of the strain gage assembly between the seat adjuster and cushion frame reduces vehicle body dimensional variation input to the strain gage compared to mounting the strain gage below the seat adjuster, between the seat adjuster and the floor, for example.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
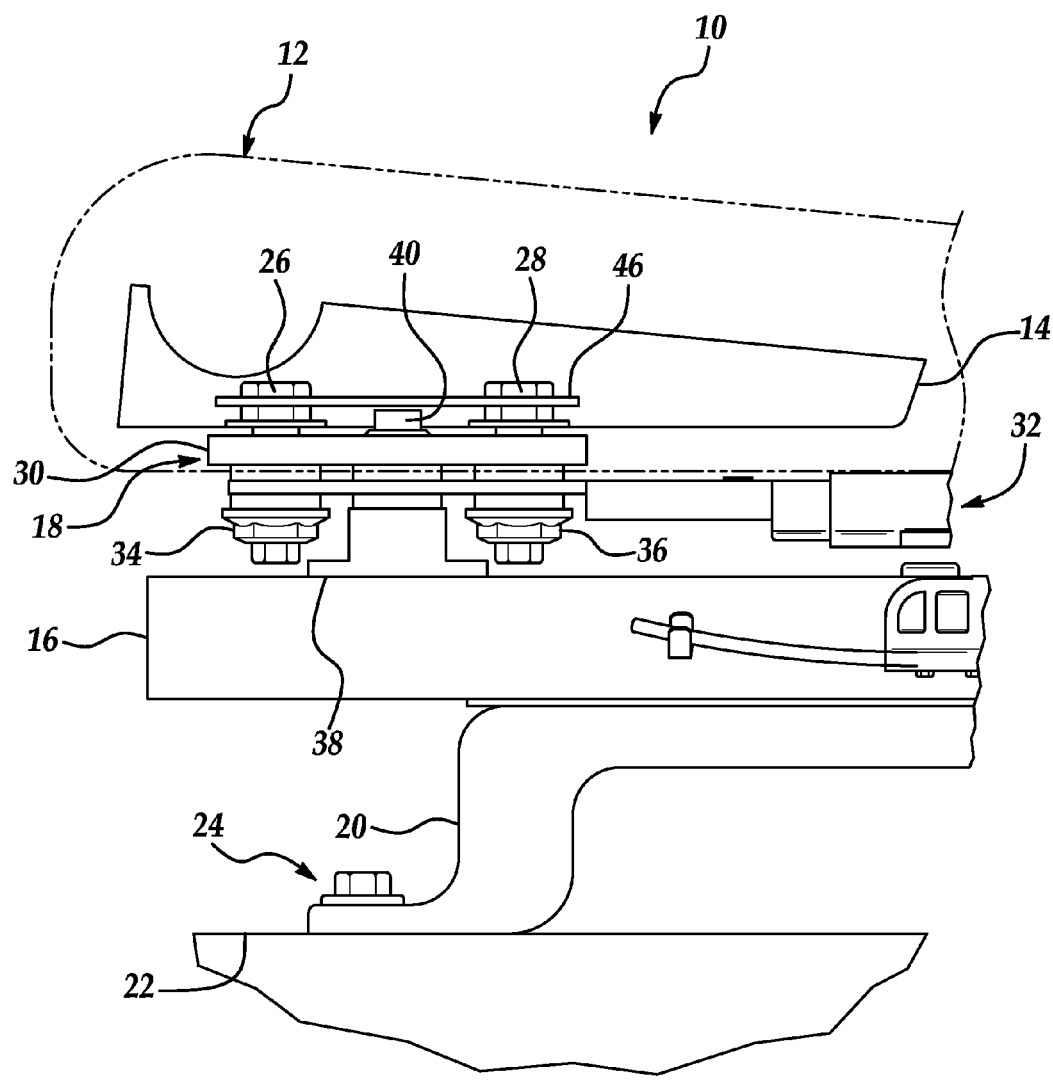
FIG. 1 is a side view of a representative vehicle seat assembly according to one embodiment of the present invention.

Referring now to FIG. 1, a load sensing vehicle seat assembly according to one embodiment of the present invention is shown. Assembly 10 includes a seat cushion 12 mounted on a cushion frame 14. Cushion frame 14 is secured to a conventional sliding seat adjuster 16 via strain gage assembly 18. Depending upon the particular application and implementation, a strain gage assembly 18 may be provided at each location where the seat cushion frame 14 (or other upper seat component) is secured to a lower seat component or the floor of the vehicle. For example, a typical application for an individual seat may include a strain gage assembly at each of four mounting locations. As explained in greater detail below, strain gage assembly 18 may be placed between various upper and lower seat components. The present inventors have recognized that it is desirable, although not required, to position strain gage assembly 18 between the seat adjuster 16 and cushion frame 14 to reduce vehicle body dimensional variation input to the strain gage as compared to other approaches that mount the strain gage between the seat adjuster and vehicle floor.

Seat adjuster 16 allows cushion 12, cushion frame 14, and strain gage assembly 18 to slide forward and backward relative to riser 20, which is secured to vehicle floor 22 via appropriate fasteners 24. An upper seating component, such as cushion frame 14, is secured to strain gage assembly 18 via conventional fasteners, such as bolts 26 and 28, that extend through corresponding apertures (not shown) in cushion frame 14, outward or end portions of a strain gage mounting element, such as strain gage mounting plate 30, and commercially available strain gage 32. Nuts 34 and 36 threadingly engage bolts 26 and 28, respectively, to secure strain gage assembly 18 to cushion frame 14. Depending upon the particular application, an optional removable assembly plate 46 (best shown in FIG. 2) may be used to position fasteners 26, 28 and prevent turning or rotation during assembly. Strain gage assembly 18 is secured to a lower vehicle seat component, such as seat adjuster 16, using a conventional fastener 40 (best shown in FIG. 2) that engages a central portion of strain gage 32 and extends through a mounting element, such as a spacer 38. As illustrated and described in greater detail with reference to FIGS. 2 and 3, strain gage mounting plate 30 includes a central aperture that provides clearance for conventional fastener 40 so that fastener 40 does not engage strain gage mounting plate 30.

In operation, a load placed on assembly 10 is transferred through cushion 12 to cushion frame 14, which is secured to strain gage mounting plate 30 and the outer portions of a sensing arm 50 (FIG. 2) of strain gage 32. Strain gage 32 is centrally supported by seat adjuster 16 through spacer 38 so that the load transferred through strain gage mounting plate 30 flexes the outer or outward portions of the sensing arm of strain gage 30 relative to the central portion of the sensing arm. Strain gage 30 is used in a conventional manner to generate a signal indicative of the deflection of the outward portions of the sensing arm relative to the central portion and therefore indicative of the load placed on assembly 10. To provide desired accuracy and repeatability of the load measurements, strain gage 30 requires a predetermined or specified flatness tolerance across the mounting surface components that engage the outward portions of the sensing arm. According to the present invention, strain gage mounting plate 30 is provided with the desired flatness across the mounting surface to provide the desired accuracy and repeatability of load measurements based on strain gage 32. Due to the size and simplicity of strain gage mounting plate 30, the desired flatness is significantly easier to achieve as compared to providing the desired flatness in other larger and more complex seating components, such as cushion frame 14, seat adjuster 16, or riser 20, for example.

Figure 2:
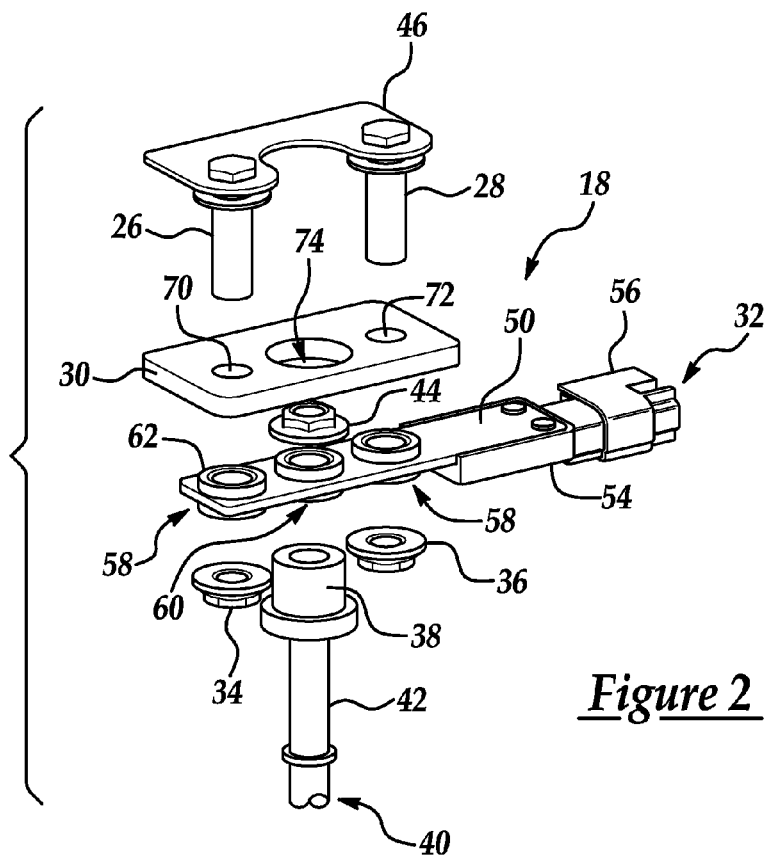
FIG. 2 is an assembly view illustrating various components of a vehicle seat load sensing assembly according to one embodiment of the present invention.

FIG. 2 illustrates various components of strain gage assembly 18 in greater detail. Commercially available strain gage 32 includes a load sensing arm 50 secured to a body 54 that is attached to a signal connector 56. Load sensing arm 50 includes outward portions 58 and a central portion 60, each with a corresponding mounting hole having upper and lower spacer inserts 62 (best shown in FIG. 3). As described above with reference to FIG. 1, central portion 60 of sensing arm 50 of strain gage 32 is supported by and secured to a lower seat component, such as the seat adjuster, by spacer 38 and fastener 40, which includes bolt 42 and nut 44 in this implementation. Nut 44 contacts spacer insert 62 of central portion 60 of sensing arm 50 but does not engage mounting plate 30, which includes a center hole 74 that provides clearance for nut 44. Spacer inserts 62 of outward portions 58 of sensing arm 50 contact corresponding outer portions of strain gage mounting plate 30. Bolts 26 and 28 pass through corresponding apertures in an upper seating component, such as the cushion frame for example (FIGS. 1 and 3), and pass through corresponding outward holes 72, 74 in strain gage mounting plate 30 to engage nuts 34, 38 and secure outer portions 58 of strain gage sensing arm 50 to the upper seating component.

In one embodiment of the present invention, a commercially available strain gage 32 specifies a mounting surface flatness tolerance of 0.11 millimeters (mm) to achieve desired load sensing performance. The strain gage includes a load sensing arm 50 having a thickness of about 3.0 millimeters. In this embodiment, strain gage mounting plate 30 has a thickness of about twice the thickness of the sensing arm, i.e. about 6.0 millimeters, to provide a suitable load transfer from the upper seating component through the mounting plate to the strain gage sensing arm. As illustrated in the Figures, strain gage mounting plate 30 is significantly smaller than various other seating components, such as cushion frame 14, seat adjuster 16, and riser 20, and is about 35 millimeters wide by about 75 millimeters long in this embodiment, such that the flatness tolerance of 0.11 millimeters can be consistently satisfied with lower cost than the larger, more complex components.

Figure 3:
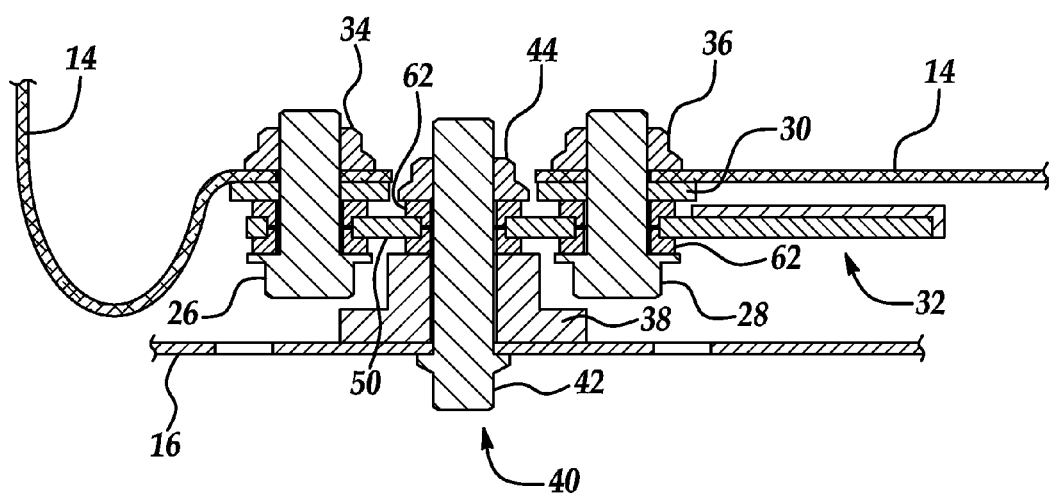
FIG. 3 is a cross-sectional view of a load detecting vehicle seat assembly according to one embodiment of the present invention.

FIG. 3 is a cross-sectional view of a load sensing seating assembly for a vehicle according to one embodiment of the present invention. The embodiment illustrated in FIG. 3 is similar to embodiments represented in FIGS. 1 and 2 with the exception of the orientation of bolts 26 and 28, which are inserted from the top of the assembly in FIGS. 1 and 2, but from the bottom of the assembly in the embodiment of FIG. 3. In addition, in this embodiment, the optional assembly plate shown in FIGS. 1 and 2 is not used. As shown in the cross-section of FIG. 3, strain gage 32 is secured to upper seat component 14 via bolts 26, 28 that extend through corresponding outward holes in sensing arm 50, strain gage mounting plate 30, and upper seating component 14, and are secured by bolts 34, 36, respectively. Strain gage mounting plate 30 has a predetermined flatness to achieve desired load sensing capabilities of strain gage 32 as described above. Strain gage 32 is supported by spacer 38, which extends between lower seating component 16 and central lower insert 62 of the strain gage sensing arm 50. Fastener 40 secures strain gage 32 to lower seating component 16. As shown in the cross-section of FIG. 3, upper seating component 14 and strain gage mounting plate 30 include apertures to provide clearance for fastener 50 so that no load is transferred directly from upper seating component 14 to lower seating component 16. Rather, the load is transferred from upper seating component 14, through strain gage mounting plate 30, to the outward portions of sensing arm 50 of strain gage 32, through the central portion of sensing arm 50, through spacer 38, to lower component 16.

As also illustrated in FIGS. 1–3, assembly of a load sensing vehicle seat having a load sensor such as a strain gage that specifies a flatness tolerance for a mounting surface according to the present invention includes positioning a strain gage between an upper seating component and a lower seating component and positioning a mounting plate having the desired flatness between the upper seat component and the strain gage. In one embodiment of a method according to the present invention, a strain gage includes a load sensing arm having three substantially equally spaced apertures in corresponding regions of the load sensing arm including a central aperture in a central region and two outward apertures in respective outward regions relative to the central region. The method includes interposing at least one mounting element having a predetermined desired flatness between the load sensing arm and at least one of a first seating component and a second seating component such that a load placed on the first seating component is transferred through the mounting element to the load sensing arm and from the load sensing arm to the second seating component. In one embodiment, the central region of the load sensing arm is supported by a lower mounting element and secured to the second seating component while the outboard regions contact an upper mounting element and are secured to the first seating component.

As such, a load sensing vehicle seat assembly according to a system or method of the present invention satisfies strain gage mounting requirements using a mounting element disposed between the strain gage and one or more vehicle seating components. The simplicity and smaller size of the mounting element that may result in significant cost savings relative to manufacturing larger and/or more complex components with the desired flatness, such as the cushion frame or seat adjuster for example. Furthermore, positioning of the strain gage assembly between the seat adjuster and cushion frame reduces vehicle body dimensional variation input to the strain gage compared to mounting the strain gage below the seat adjuster, between the seat adjuster and the floor, for example.

While the best mode for carrying out the invention has been described in detail, those familiar with the art to which this invention relates will recognize various alternative designs and embodiments for practicing or implementing the invention as defined by the following claims.

What is claimed is:

1. A load sensing vehicle seat assembly comprising:
   an upper seating component;
   a lower seating component;
   a strain gage having a predetermined flatness specification for a mounting surface and having a load sensing arm having three substantially equally spaced regions including a central region and two outward regions each having a mounting aperture and wherein the central region is secured to either the upper or lower seating component and the outward regions are secured to either the lower or upper seating component, respectively, the strain gage being disposed between the upper seating component and the lower seating component; and
   a strain gage mounting element extending across the mounting apertures of the load sensing arm and having a predetermined desired flatness tolerance across the mounting apertures of the loan sensing arm and disposed between the strain gage and one of the upper seating component and the lower seating component such that a load placed on the seat assembly is transferred through the upper seating component through the mounting element and the strain gage to the lower seating component.

2. The assembly of claim 1 wherein the upper seating element comprises a cushion frame and the lower seating component comprises a seat adjuster.

3. The assembly of claim 1 wherein the central region is secured to the lower seating component and the outward regions are secured to the upper seating component through the strain gage mounting element.

4. The assembly of claim 3 further comprising:
   fasteners for securing the two outward regions to the upper seating component; and
   a removable assembly plate having apertures adapted to position the fasteners and prevent the fasteners from rotating during assembly.

5. The assembly of claim 1 further comprising a second strain gage mounting element disposed between the strain gage and the lower seating component.

6. The assembly of claim 1 wherein the strain gage mounting element has a mounting surface flatness tolerance of about 0.1 millimeters.

7. A vehicle seat assembly comprising:
   a first vehicle seating component;
   a load sensor having a sensing arm with a central mounting region secured to the first seating component for providing an indication of a load placed on the first seating component, the load sensor having a mounting surface with a predetermined flatness specification;
   a second vehicle seating component secured to opposite sides of the central mounting region of the sensing arm; and
   a mounting element extending across mounting regions of the sensing arm and having a predetermined flatness satisfying the predetermined flatness specification of the load sensor, the mounting element disposed between the first seating component and the load sensor.

8. The vehicle seat assembly of claim 7 wherein the first vehicle seating component comprises a cushion frame and the second vehicle seating component comprises a seat adjuster.

9. The vehicle assembly of claim 8 further comprising a riser adapted for mounting to a vehicle floor, the riser cooperating with the seat adjuster to allow sliding of the cushion frame relative to the riser.

10. The vehicle seat assembly of claim 7 wherein the first vehicle seating component comprises a cushion frame.

11. The vehicle seat assembly of claim 7 wherein the load sensor comprises a strain gage.

12. A method for providing a load sensing vehicle seat assembly, the method comprising:
   positioning a load sensor having a mounting surface flatness specification between upper and lower seating components;
   positioning a mounting element having a flatness that satisfies the flatness specification of the load sensor between the first seating component and the load sensor;
   securing a central region of the load sensor to one of the upper and lower seating components through the mounting element; and
   securing opposite sides of the central region of the load sensor to one of the lower and upper seating elements, respectively.

13. The method of claim 12 wherein the load sensor comprises a strain gage.

14. The method of claim 12 wherein the upper seating component comprises a cushion frame.

15. The method of claim 12 wherein the lower seating component comprises a seat adjuster.

* * * * *